Feb. 11, 1930.　　　A. J. MEYER　　　1,746,548
INTERNAL COMBUSTION ENGINE
Filed Jan. 26, 1928　　2 Sheets-Sheet 1
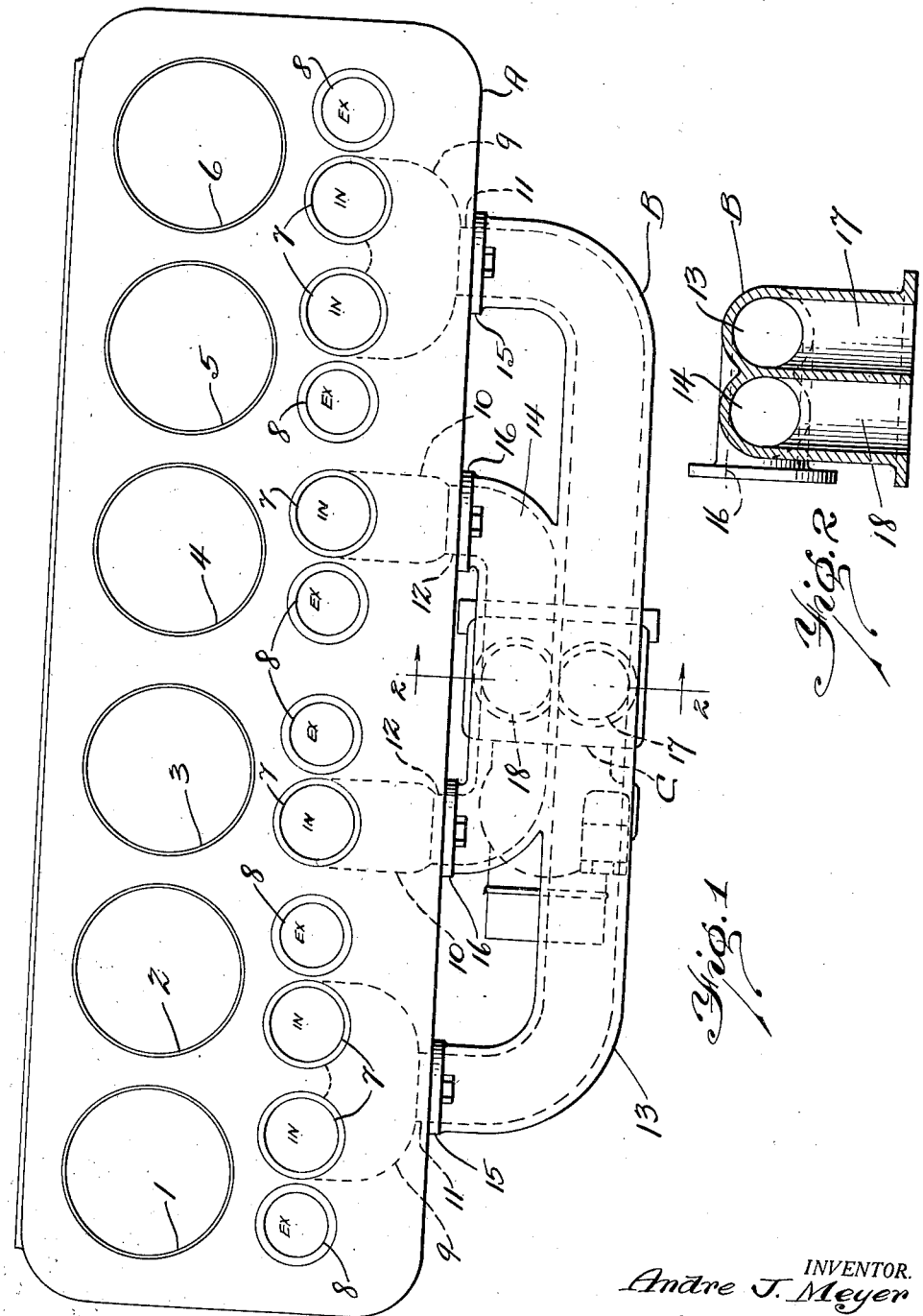
INVENTOR.
André J. Meyer
BY W. W. Harris
ATTORNEY.

Feb. 11, 1930. A. J. MEYER 1,746,548
INTERNAL COMBUSTION ENGINE
Filed Jan. 26, 1928 2 Sheets-Sheet 2
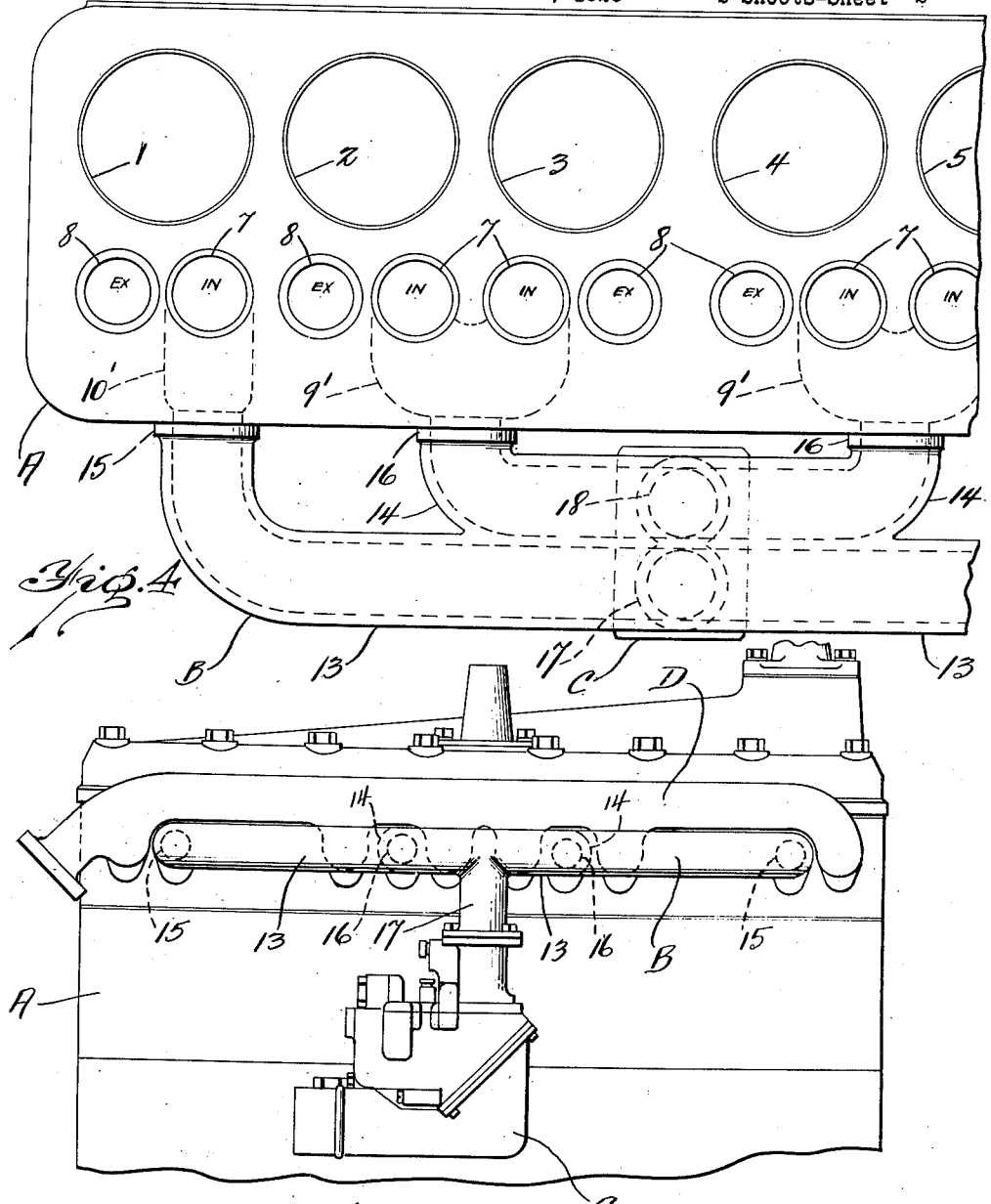
INVENTOR.
André J. Meyer
BY W. W. Harris
ATTORNEY.

Patented Feb. 11, 1930

1,746,548

UNITED STATES PATENT OFFICE

ANDRE J. MEYER, OF DETROIT, MICHIGAN, ASSIGNOR TO CONTINENTAL MOTORS CORPORATION, OF DETROIT, MICHIGAN, A CORPORATION OF VIRGINIA

INTERNAL-COMBUSTION ENGINE

Application filed January 26, 1928. Serial No. 249,516.

This invention relates to internal combustion engines and refers more particularly to improved means for supplying fuel intake mixture to engines having six cylinders generally in line.

One object of my invention resides in providing an intake manifold construction for a six cylinder engine, the manifold having separate conduits which are connected in a novel manner with certain cylinder groups for increasing the power output of the engine and to otherwise increase the efficiency and smooth running qualities of the six cylinder engine.

A further object of my invention resides in the provision of a simply constructed manifold which is compact and which is capable of being manufactured at relatively low cost.

Another feature of my invention resides in the provision of a six cylinder intake manifold which will accommodate, where desired, a dual carburetor facilitating idling and low speed conditions of the engine as well as affording improved operation over all speed ranges for six cylinder engines.

Referring to the accompanying drawings which illustrate my invention,

Fig. 1 is a plan view of a cylinder block of a six cylinder engine showing my improved fuel mixture intake construction.

Fig. 2 is a detail sectional view through 2—2 of Fig. 1,

Fig. 3 is a side elevation view of the six cylinder engine showing the intake and exhaust manifold assembled on the engine, and Fig. 4 is a view corresponding to Fig. 1 illustrating a modified form of my invention.

In the drawings reference character A represents the engine cylinder block having six cylinders 1, 2, 3, 4, 5, and 6. The engine illustrated is in general, well known, each cylinder having associated therewith a pair of intake and exhaust valve ports or openings 7 and 8 respectively, the intake ports being designated "In" and the exhaust ports "Ex." In Fig. 1 cylinders 1, 2 and cylinders 5, 6 respectively have their intake ports 7 connected by a common fuel mixture supply passage 9 preferably within the cylinder block A, while cylinders 3 and 4 are provided with individual supply passages 10. For clarity the exhaust port passages are omitted as these may be conventional or as preferred. The passages 9 and 10 open outwardly of the cylinder block at 11 and 12 respectively.

I have provided an intake manifold structure B which is formed with separate portions for respectively supplying fuel mixture from a fuel mixing device or carburetor C to the passages 9 and 10. To this end the manifold B has main separate conduits or passages 13 and 14 extending generally longitudinally of the engine. Opposite ends of the conduit 13 communicate at 15 with openings 11 and opposite ends of the conduit 14 communicate at 16 with the openings 12. Preferably substantially centrally longitudinally of the engine cylinder block and of the conduits 13 and 14 are separate conduits 17, 18 respectively branched with the main conduits 13, 14 and respectively communicating therewith. The carburetor C as illustrated may be of the well known commercial dual type for supplying fuel mixture to the branches 17, 18. In Fig. 3 the exhaust manifold D may be of any desired construction suitable for the engine.

In practice it is sometimes desirable to connect the manifold conduits or branches with one or more tubes or passageways of relatively small cross-sectional area (not shown) for the purpose of balancing the pressure in the two conduits facilitating low speed operation, balancing tubes in the art in general being well known, but such provision does not affect the separate conducting of the fuel mixture from the supply to the cylinders such as I have disclosed as illustrating my invention.

The particular problem dealt with in my invention is in manifolding a six cylinder engine in an improved manner. Duplex manifolding arrangements have at present come into extensive use in eight cylinder engines but it is recognized that engines of different numbers of cylinders present different problems of fuel distribution peculiar to each type of engine, with considerations for example, to valve timing throughout an engine cycle, valve port locations, engine size and general performance, and other well known differentiating factors.

With the engine illustrated in Fig. 1 timed for example in the customary firing order of cylinders as 1—5—3—6—2—4 it is apparent that the intake ports supplied by an end of either of the conduits 13, 14, will not overlap since the least period of successive opening is 240° between cylinders 2 and 1, successive valve openings being generally 120° for a six cylinder four stroke cycle engine. Thus the fuel mixture is efficiently distributed to the cylinders, and each intake valve of each conduit 13, 14 is preferably subjected to substantially the same conditions of fuel mixture flow as illustrated in Fig. 1.

In Fig. 4 the arrangement is in general the same as in Fig. 1 except that the intake ports of end cylinders 1, 6 individually communicate with manifold conduit ends 15 by reason of supply passages 10′ while cylinders 2, 3 and cylinders 4, 5 respectively have their intake ports connected with the manifold conduit ends 16 through common supply passages 9′. The construction otherwise corresponds with that described and illustrated in connection with Figs. 1, 2 and 3 and the foregoing description and remarks apply with equal effect to the modified structure of Fig. 4.

In some instances it may be found desirable to employ a single jet carburetor with a common mixing chamber below the branches 17, 18, utilizing the teachings of my invention, but I prefer, in securing the best improved results, to employ a dual carburetor with independent jets for the branches 17 and 18.

What I claim as my invention is:

1. In combination with an internal combustion engine having six aligned cylinders; a fuel mixture supply device for the engine comprising; a pair of conduits; fuel mixture supply means for the conduits; one of said conduits extending from the fuel mixture supply means and having its opposite ends respectively connected to supply fuel mixture to one of said cylinders; the other of said conduits extending from the fuel mixture supply means and having its opposite ends respectively connected to supply fuel mixture to the remaining groups of two adjacent cylinders; said conduits separately conducting the fuel mixture from the fuel mixture supply means to the respective cylinders aforesaid.

2. A fuel mixture supply device for six cylinder internal combustion engines comprising, a main conduit having its opposite ends respectively connected to supply fuel mixture to a pair of adjacent cylinders, a second main conduit having its opposite ends respectively connected to supply fuel mixture to the remaining single cylinders, and fuel mixture supply means for the main conduits.

3. In combination with an internal combustion engine having six aligned cylinders; a fuel mixture supply device for the engine comprising; a pair of conduits; fuel mixture supply means for the conduits; one of said conduits extending from the fuel mixture supply means and having its opposite ends respectively connected to supply fuel mixture to one of the said cylinders; the other of said conduits extending from the fuel mixture supply means and having its opposite ends respectively connected to supply fuel mixture to the remaining groups of two adjacent cylinders.

4. In combination with an internal combustion engine having six aligned cylinders; a fuel mixture supply device for the engine comprising; a pair of conduits; a dual carburetor for supplying fuel mixture to the conduits; one of said conduits extending from the dual carburetor and having its opposite ends respectively connected to supply fuel mixture to one of said cylinders; the other of said conduits extending from the dual carburetor and having its opposite ends respectively connected to supply fuel mixture to the remaining two groups of two adjacent cylinders; said conduits separately conducting the fuel mixture from the dual carburetor to the respective cylinders aforesaid.

5. In combination with an internal combustion engine having six aligned cylinders; a dual carburetor positioned substantially at the mid-point longitudinally of the engine cylinders; a pair of vertically extending manifold conduits separately communicating with the carburetor; a manifold passage extending generally longitudinally with respect to the engine cylinders and communicating with one of said vertically extending manifold conduits, opposite ends of said manifold passage being arranged for respectively supplying fuel mixture to one of the engine cylinders; a second manifold passage extending generally longitudinally with respect to the engine cylinders and communicating with the other of said vertically extending manifold conduits, opposite ends of said second manifold passage being arranged for respectively supplying fuel mixture to the remaining two groups of two adjacent cylinders each; said manifold passages separately conducting fuel mixture from the respective manifold conduits to the respective cylinder groups aforesaid.

6. A fuel mixture supply device for internal combustion engines having six aligned cylinders each provided with a valve port opening for the intake mixture, two of said port openings each having a fuel mixture supply passage extending to one side of the engine, the remaining two groups of two port openings respectively for adjacent cylinders having a common fuel mixture supply passage extending to the said engine side, a fuel mixture supply device, and separate conduits extending from said fuel mixture supply device, one of said separate conduits having its opposite ends communicating respectively with the first said fuel mixture supply passages at the said engine side, and the other of said separate conduits having its opposite ends communicating respectively with the said common fuel mixture supply passages at the said engine side.

7. A fuel mixture supply device for internal combustion engines having six aligned cylinders each provided with a valve port opening for the intake mixture, two of said port openings each having a fuel mixture supply passage extending to one side of the engine, the remaining two groups of two port openings respectively for adjacent cylinders having a common fuel mixture supply passage extending to the said engine side, a fuel mixture supply device, and separate conduits extending from said fuel mixture supply device, one of said separate conduits having its opposite ends communicating respectively with the first said fuel mixture supply passages at the said engine side, and the other of said separate conduits having its opposite ends communicating respectively with the said common fuel mixture supply passages at the said engine side, the said separate conduits separately conducting fuel mixture from the fuel mixture supply device to the respective cylinders aforesaid.

8. In combination with a six cylinder engine, fuel mixture means, means conducting fuel mixture from the fuel mixture means to two of said cylinders, means separate from the second said means for supplying fuel mixture from the fuel mixture means to the remaining two groups of two cylinders each.

9. In combination with a six cylinder engine, fuel mixture means, means conducting fuel mixture from the fuel mixture means to two of said cylinders, means separate from the second said means for supplying fuel mixture from the fuel mixture means to the remaining two groups of two adjacent cylinders each.

In witness whereof, I hereunto subscribe my name this 23rd day of January, A. D. 1928.

ANDRE J. MEYER.